Figure 11:
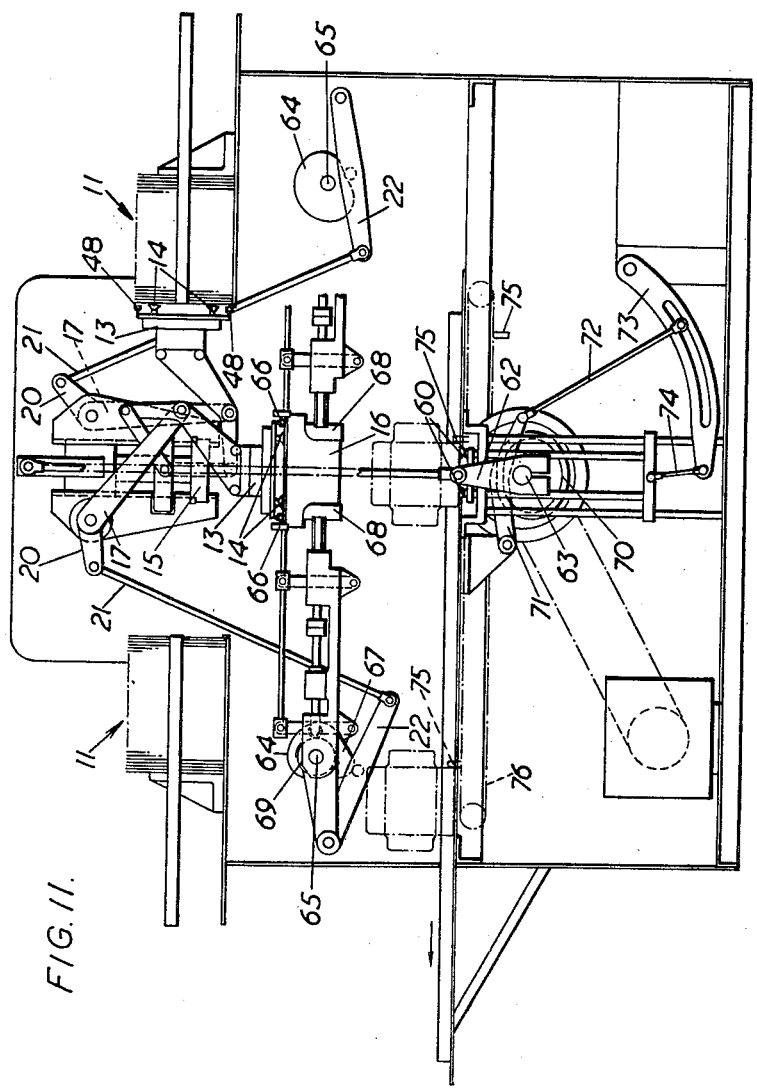

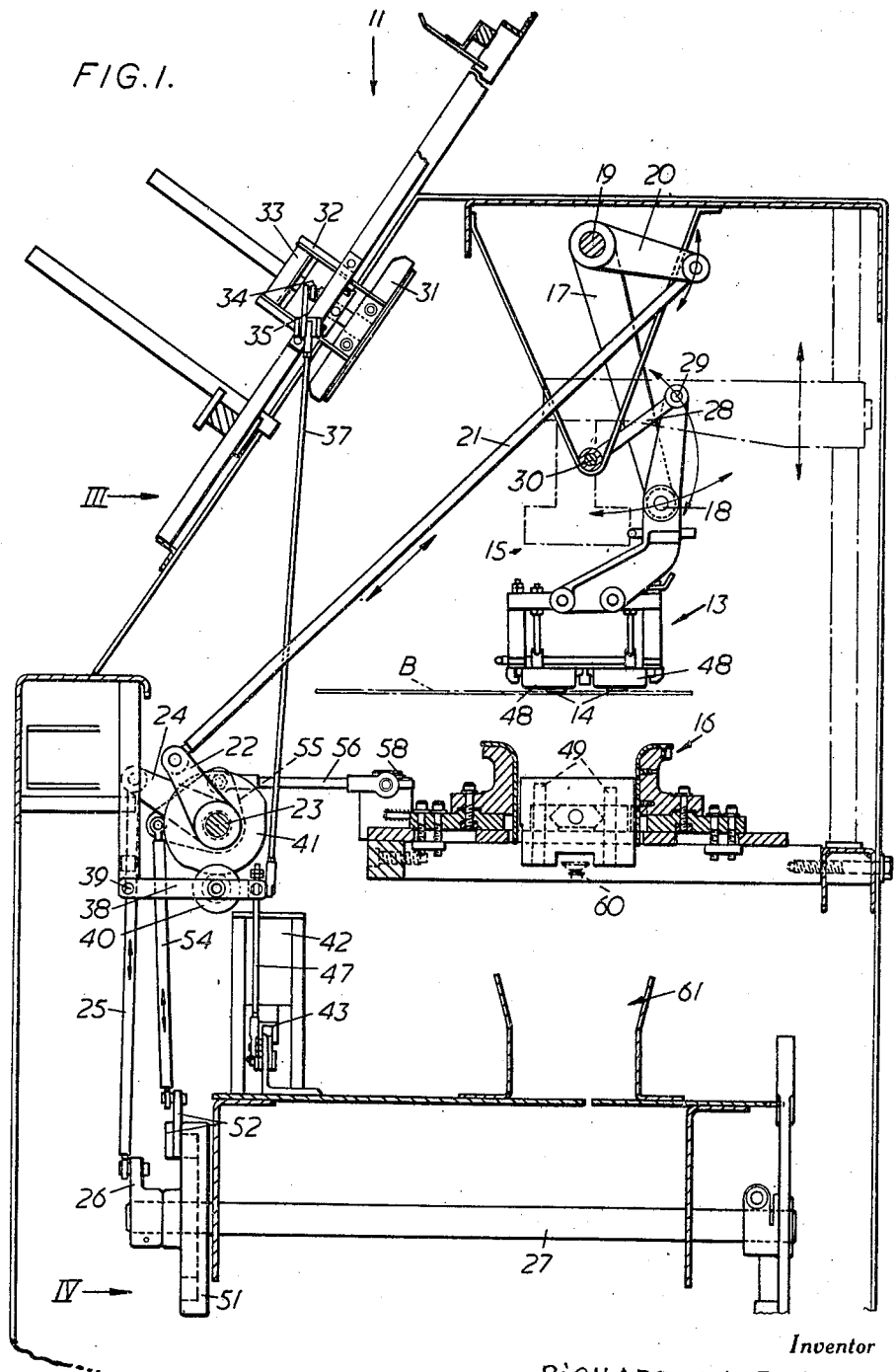

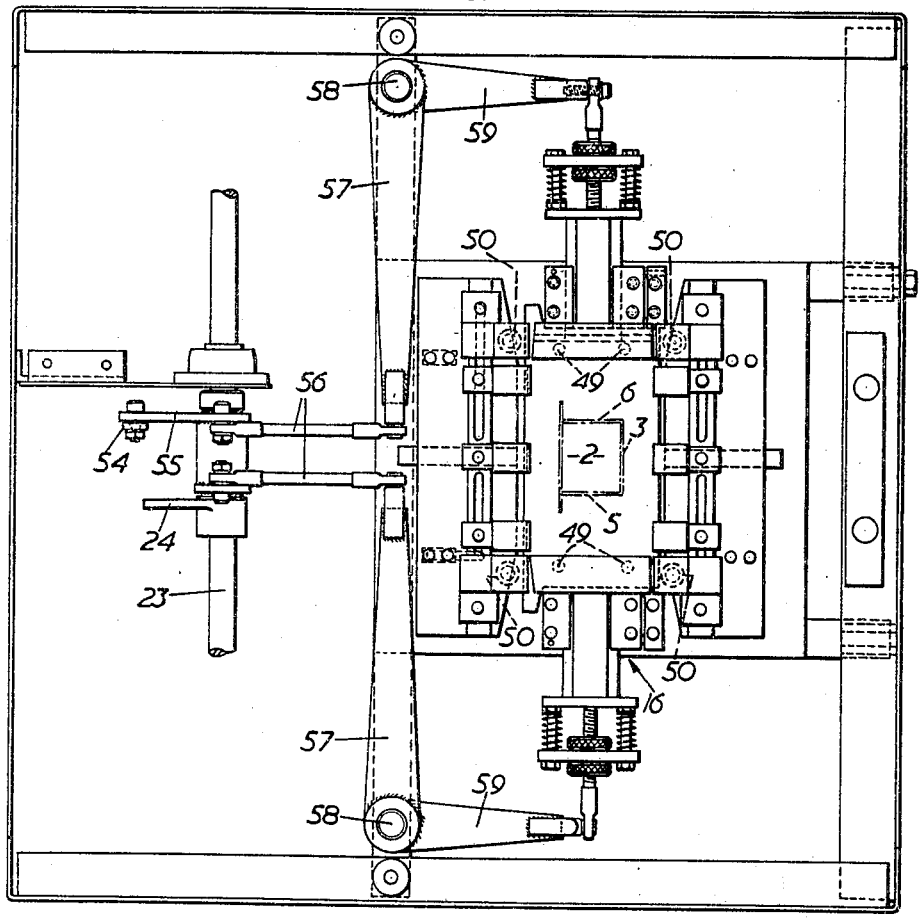

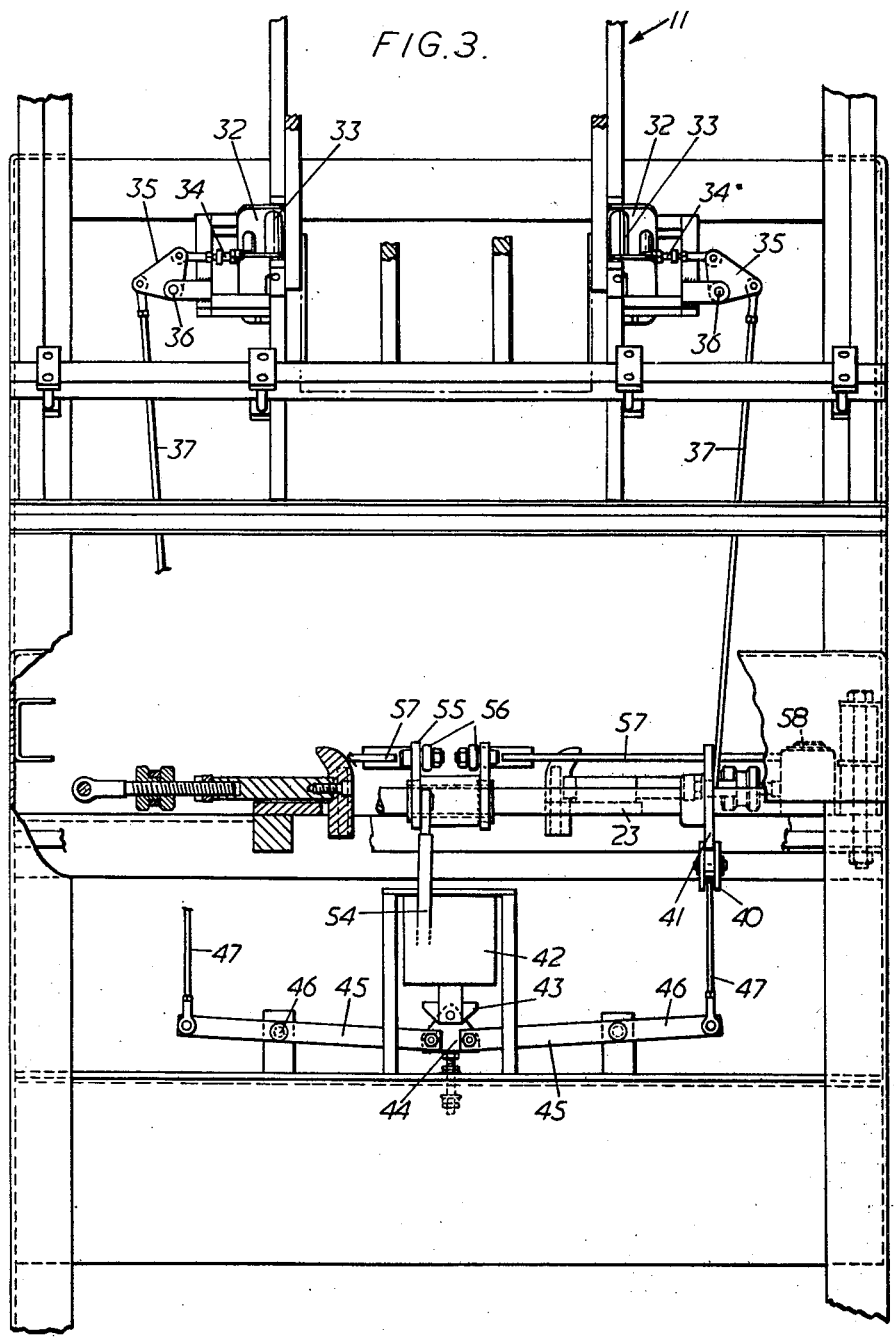

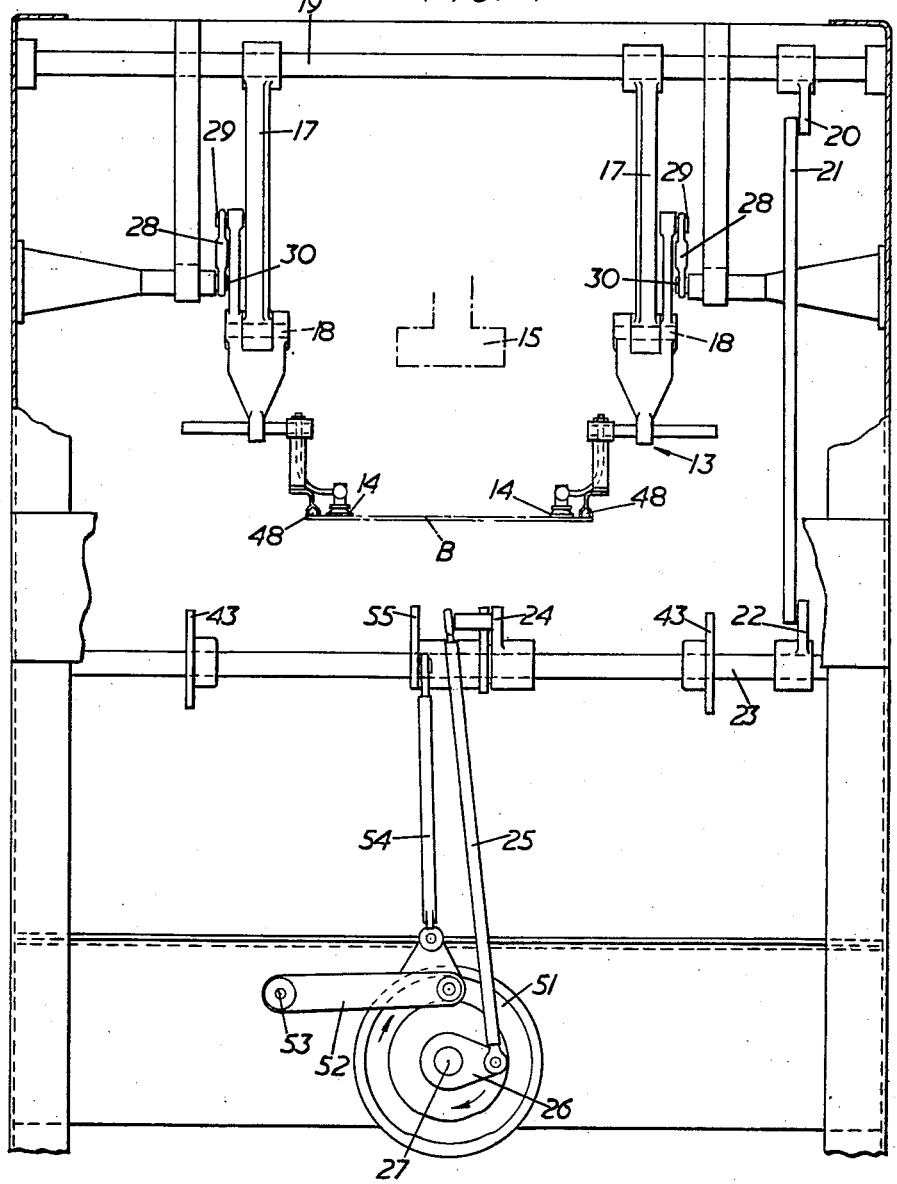

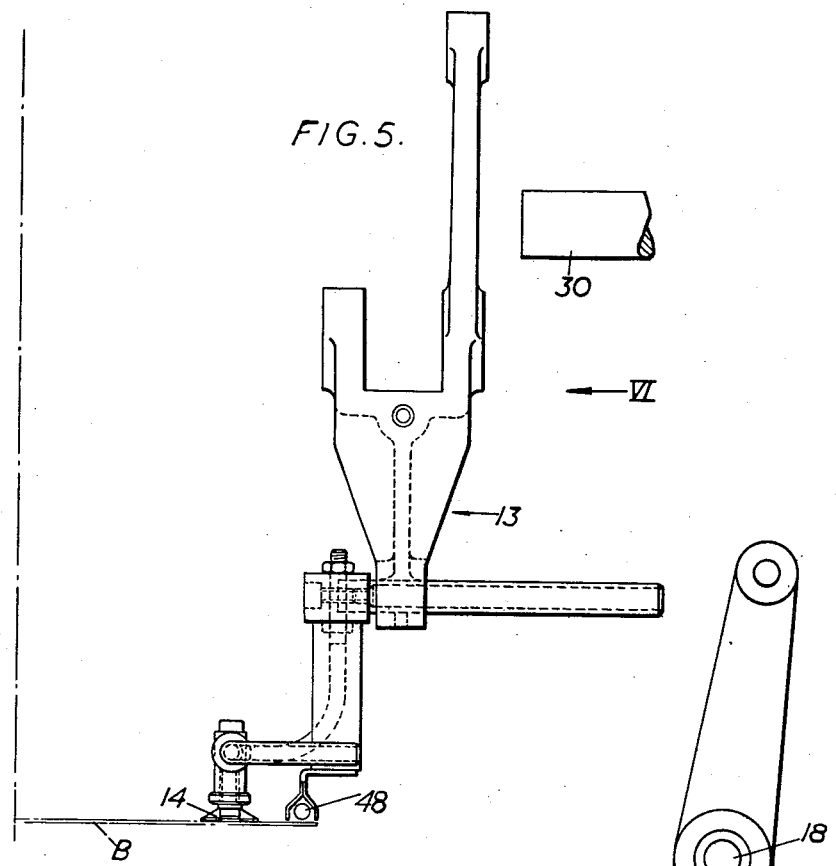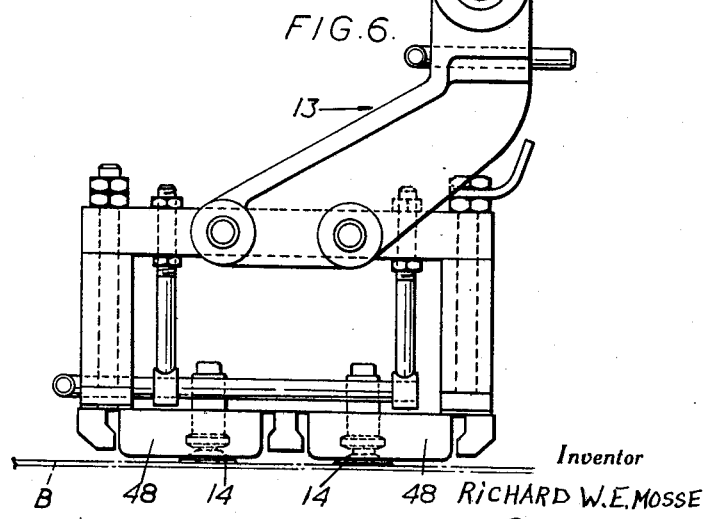

Nov. 14, 1961 R. W. E. MOSSE 3,008,386
APPARATUS FOR SETTING-UP CARTONS
Filed Dec. 29, 1959 7 Sheets-Sheet 6
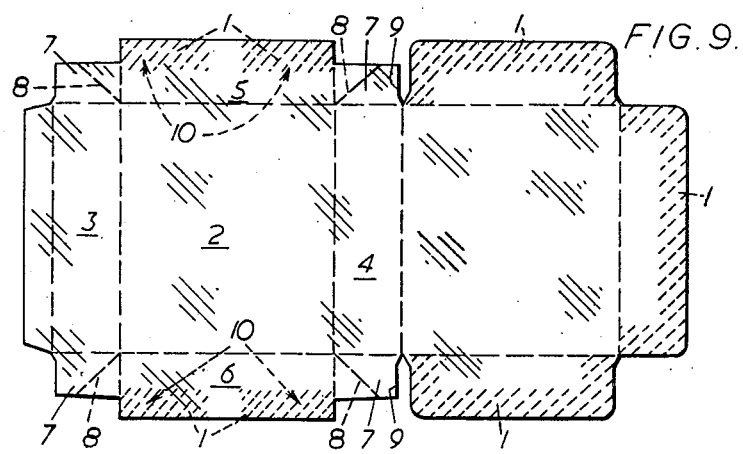
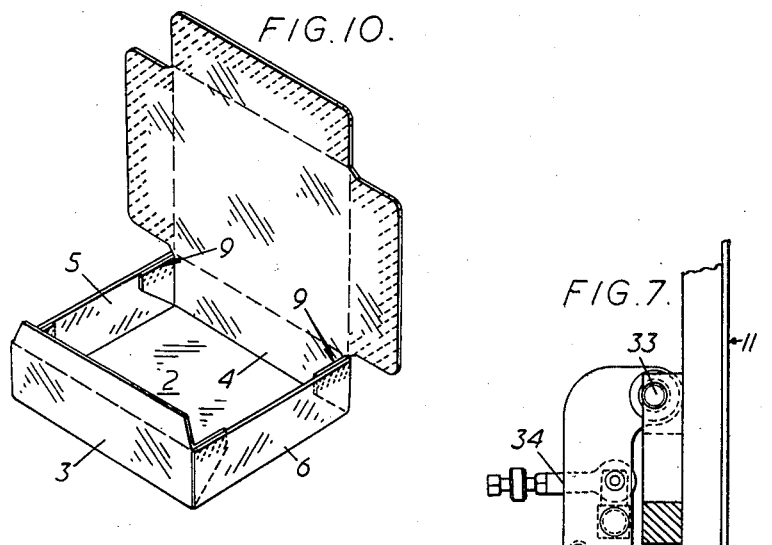
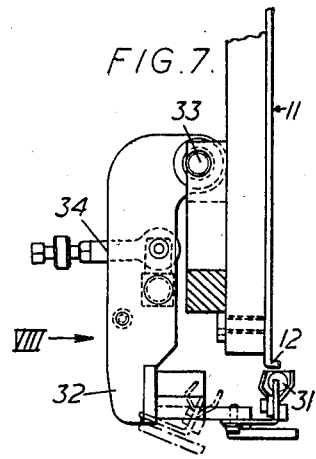
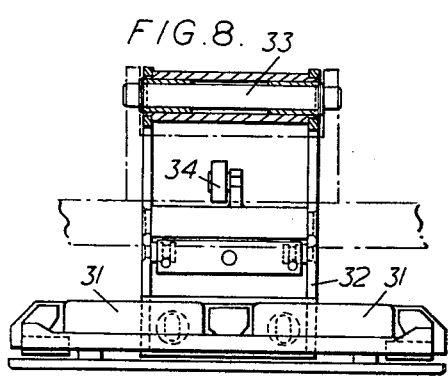
Inventor
RICHARD W. E. MOSSE
By *Imirie & Smiley*
Attorneys Nov. 14, 1961                R. W. E. MOSSE                3,008,386
                        APPARATUS FOR SETTING-UP CARTONS
Filed Dec. 29, 1959                                    7 Sheets-Sheet 7

Inventor
RICHARD W. E. MOSSE
By Imirie & Smiley
Attorneys

United States Patent Office 3,008,386
Patented Nov. 14, 1961

3,008,386
APPARATUS FOR SETTING-UP CARTONS
Richard Wolfgang Emil Mosse, London, England, assignor to The Metal Box Company Limited, London, England, a company of Great Britain
Filed Dec. 29, 1959, Ser. No. 862,688
Claims priority, application Great Britain Jan. 26, 1959
20 Claims. (Cl. 93—51)

This invention relates to apparatus for setting-up cartons from carton blanks which in the set-up condition thereof have overlying portions arranged to be secured one to the other by a thermoplastic adhesive composition pre-applied to the blank.

When setting up cartons from blanks of the kind above-mentioned it is necessary to effect heating of the thermoplastic adhesive composition in order that overlying blank portions to be secured together can be pressed into engagement with each other and firmly adhered to each other by the adhesive composition. Heretofore it has been customary to effect the heating of the thermoplastic adhesive composition while the blank is in the set-up condition thereof within the die and it has been necessary to retain the set-up blank within the die for an interval of time such that the adhesive composition becomes softened sufficiently for the pressure exerted on the overlying portions to cause satisfactory adherence of the portions one to the other. The time necessary for the satisfactory heating of the blanks within the die has restricted the rate of operation of the setting-up apparatus and it is an object of the present invention to effect heating of the appropriate portion of a blank before movement thereof into the die thus reducing the heating time required when the blank is set-up in the die.

According to the invention there is provided the method of setting-up a carton from a blank having portions which in the set-up condition of the blank are to overlie and be secured to each other by a thermoplastic adhesive composition pre-applied to the blank, which method comprises applying heat to said portions of a blank when engaging the blank for removal thereof from a magazine, maintaining the application of heat to said portions at least until the blank is positioned over a die, and moving the blank into the die to effect setting-up of the blank.

Further according to the invention there is provided carton setting-up apparatus comprising a plunger, a die into which a carton blank can be pressed by the plunger to effect the setting-up thereof and the pressing together of overlying blank portions which during setting-up are to be secured one to the other by a thermoplastic adhesive composition pre-applied to the blank, a magazine to contain a stack of said carton blanks, a transfer device to remove an endmost blank from the stack and to release it at a position over the die for movement into the die by the plunger, and heater means movable with the transfer device to effect heating of a blank in the regions thereof to which said adhesive composition is pre-applied, said heater means being operable to apply heat to a blank on engagement thereof by the transfer means and to maintain the application of heat to the blank at least until the blank is released by the transfer means.

In order that the invention may be clearly understood, two embodiments thereof will now be described, by way of example, with reference to the accompanying diagrammatic drawings, in which FIG. 1 is a section through setting-up apparatus according to the invention, FIG. 2 is a plan of FIG. 1, with some parts omitted for clarity, FIG. 3 is a view, partly in section, looking in the direction of arrow III, FIG. 1, FIG. 4 is a view looking in the direction of arrow IV, FIG. 1, with some parts omitted for clarity, FIG. 5 is a detail of a part of a blank transfer device embodied in the apparatus, FIG. 6 is a view looking in the direction of arrow VI, FIG. 5, FIG. 7 illustrates heater means co-operating with a magazine from which blanks are fed from a stack, FIG. 8 is a view looking in the direction of arrow VIII, FIG. 7, FIG. 9 illustrates one form of blank which can be set-up by the apparatus, FIG. 10 illustrates the blank of FIG. 9 in the set-up condition thereof, and FIG. 11 illustrates diagrammatically a modified form of apparatus according to the invention.

In the drawings like references indicate like or similar parts.

Referring to the drawings, the blank illustrated in FIG. 9 is of known kind and is made of cardboard or other suitable material, the opposite sides of which are gloss-waxed with a coating of low viscosity paraffin wax. Beneath the wax on one side of the blank, the cardboard is coated with a thermoplastic adhesive composition 1, FIG. 9, the composition being applied to the portions of the blank which, in the set-up condition thereof, are to form the heat seals by which the carton is retained in the set-up condition. In the form of blank being described the thermoplastic adhesive composition is a composition which is incompatible with the wax, is non-tacky at normal temperatures and is softened at a temperature higher than the melting temperature of the wax, the softening temperature of the adhesive composition being preferably appreciably above the melting temperature of the wax, the difference being for example of the order of 20° C. One suitable form of thermoplastic adhesive composition is a polyvinyl acetate resin having incorporated therein plasticizers which render it heat-sealable but non-tacky at normal temperatures when applied to a blank.

The blank as illustrated in FIG. 9 is to form a carton body portion having a rectangular four-sided bottom 2, to the sides of which are hinged a front wall 3, a rear wall 4, and two side walls 5, 6. In the set-up condition of the body portion, as illustrated in FIG. 10, the front, rear, and side walls are all retained in the erect condition thereof by infolded corner flaps 7, each of which is folded about a score or crease 8 so that when the corner flaps are folded, as illustrated in FIG. 10, marginal portions 9 overlie regions 10 of adhesive composition provided on the sides 5, 6 beneath the gloss wax coating. As the apparatus according to the present invention is concerned only with setting-up a carton ready for filling, as illustrated in FIG. 10, further description of the blank is not necessary to the understanding of the apparatus to be described below.

Referring to FIGS. 1 to 8, a stack of carton blanks as described above is contained in a magazine 11, FIGS. 1 and 3, the lowermost blank of the stack resting on ledges 12, FIG. 7, the bottom blank is engageable by a transfer device 13 which incorporates suction pads 14, FIGS. 1, 4, 5 and 6 by which the blank B is gripped and withdrawn from the magazine 11. The transfer device moves the blank to a position, as illustrated diagrammatically in FIG. 1, at which it is disposed just above guide pins, not shown, which when the blank is released by the transfer device 13 guide it while it falls on to the top of a die 16 into which it is moved by a forming plunger 15. Movement of the blank by the forming plunger 15 into the die 16 causes the blank to be set-up to the condition thereof illustrated in FIG. 10.

The transfer device is movable between the blank-receiving and the blank-delivering positions thereof by a transfer link mechanism which consists of arms 17 pivoted at 18 to the transfer device and connected to rock shaft 19 which also has secured thereto an arm 20 connected to one end of a link 21. The other end of the link 21 is connected to a further arm 22 which is secured to a rock shaft 23, rocking movement of which is effected through the medium of an arm 24 secured thereto, and a link 25 which is connected to a crank arm 26 rotatable with a drive shaft 27.

Also connected to the transfer device to control pivotal movement thereof about the pivot 18 are links 28 pivoted at 29 to the transfer device and rockable about pivots 30.

In accordance with the invention auxiliary heater means co-operate with the magazine 11 to effect heating of the blank which rests on the ledges 12, the heating being effected in those regions 10, FIG. 9, of the blank to which the adhesive composition 1 is applied. In a preferred embodiment of the invention the auxiliary heater means comprises an electrical heating device which, in the drawings, is illustrated as an electrical resistance 31, FIG. 7. Each heater device 31 is supported by a bracket 32 which is pivoted at 33 to the magazine 11 to permit the auxiliary heater device to be moved from the full-line position thereof, as illustrated in FIG. 7, in which it effects heating of the regions 10 of the lowermost blank of the stack, to the chain-line position thereof in which it is moved out of proximity with the lowermost blank to permit the blank to be freely withdrawn from the magazine by the transfer device 13. To this end the auxiliary heater device 31 is movable in timed relation with the transfer means 13, and each bracket 32 is connected through a link 34 with a triangular plate 35 pivoted at 36, FIG. 3, to a support extending from the side of the magazine 11. The plate 35 is rockable about its pivot 36 by a link 37 of which one end is connected to plate 35 and the other is connected to a rocking arm 38, FIG. 1, pivoted at 39. Rocking arm 38 supports a cam follower 40 which is engaged with an actuator cam 41 secured to the rock shaft 23. Thus, on rocking of rock shaft 23 by the crank arm 26 the actuator cam 41 causes the link 37, during movement of the transfer device towards the receiving position, to withdraw the auxiliary heater devices 31 out of proximity with the blank just prior to the suction pads 14 engaging the blank to effect withdrawal thereof from the magazine. Just after the lowermost blank is withdrawn from the stack the auxiliary heater devices 31 are returned to the positions thereof in which they are again located in close proximity with the lowermost blank of the stack.

It will be understood that if the machine should be stopped for any length of time and the auxiliary heater devices 31 not moved out of proximity with the lowermost blank of the stack there would be a possibility of the blanks catching fire and to avoid this contingency means are provided to effect relative movement between the auxiliary heater devices 31 and the end most blank of the stack. Such means may comprise a pusher element adapted to engage the endmost blank and to move it, together with the remainder of the stack, to a position at which it is beyond the effective range of the auxiliary heaters or, as shown in the drawings, means are provided to move the auxiliary heater devices 31 out of proximity with the blanks, the arrangement being such that the heater devices 31 are moved out of proximity with the blanks when the apparatus is rendered inactive and are restored into proximity with the blanks when the apparatus is next rendered active. To this end there is provided an electro-magnet 42, FIG. 2, the armature 43 of which is connected to a plate 44 which is also connected to rocking levers 45 pivoted at 46 and connected to links 47 which are also connected to the rocking arm 38. The links 47 are so connected to the rocking arm 38 that during operation of the apparatus the rocking arm 38 moves relative to the links 47. The machine em-bodying the apparatus herein described will usually be operated by an electric motor and stopping and starting of the motor controlled by a start/stop button, not shown, included in the motor circuit, and the arrangement is such that when the start/stop button is operated to cause the apparatus to be rendered inactive the electromagnet is energised so that the armature 43 is moved upwards, as viewed in FIG. 3, thus pulling the links 47 downwards, as viewed in FIGS. 1 and 3, and so causing the links 47 to withdraw the auxiliary heater devices 31 out of proximity with the lowermost blank of the stack. It will be understood that operation of links 47 to effect withdrawal of the auxiliary heater devices can be effected at any time irrespective of the position of actuator cam 41 at that time.

From the foregoing it will be understood that heating of the regions 10 of the blank is effected before removal of the blank from the magazine, but in order to maintain and continue the heating of the blank during movement thereof to the position at which it is moved into the die 16, the transfer device 13 is also provided with heater means arranged to apply heat to the regions 10 of the blank which is being transferred by the transfer device from the magazine to the position from which it is moved into the die. The heat means provided on the transfer device are preferably electrical radiant heating devices 48, FIG. 5, similar to the auxiliary heating devices 31.

A third heater means co-operates with the dies 16 to maintain the heated condition of the regions 10 of the blank and this heater means comprises electrical heater element 49, 50, FIG. 2.

When the blank B is forced into the die 16 by the forming plunger 15, the blank, as indicated in chain line in FIG. 2, assumes the form thereof as illustrated in FIG. 10 and, as the thermoplastic adhesive composition applied to the regions of the blank is already sufficiently softened, on movement of the blank into the die the sealing pressure can be applied to the blank immediately the forming plunger reaches the lowermost position thereof. The sealing pressure is applied through the medium of a cam 51, FIG. 1, rotatable with the shaft 27 and arranged to effect rocking of an arm 52, pivoted at 53, FIG. 4, to which is connected one end of a link 54 the opposite end of which is connected to a tringular plate 55 which is rockable about shaft 23. The plate 55 operates rods 56 which in turn operate arms 57 rockable with spindles 58. Further arms 59 are rockable with the spindles 58 and are connected to movable sides of the die.

Following the application of the sealing pressure to the set-up carton, the plunger 15 is withdrawn and the set-up carton is removed from the bottom of the die by a suction device 60, indicated in chain-line in FIG. 1, and is deposited thereby into a chute 61 from which it can be removed in any suitable manner for transfer to a filling and closing machine.

Referring to FIG. 11, the figure illustrates diagrammatically a modified form of apparatus according to the invention by means of which it is possible to dispense with the auxiliary heater means described above and to effect all heating by the heater means 48 which co-operates with the transfer device 13.

As can be seen from FIG. 11, two magazines 11 are provided and are disposed respectively on opposite sides of the path of the plunger 15 which, in this embodiment of the invention, is operated by a crank 62 from the main shaft 63 of the machine. A transfer device 13, 14 is provided for each magazine 11 and each transfer device is provided with a transfer link mechanism 17, 20, 21, 22. The transfer link mechanisms are however, operated alternately by cams 64 rotated with shafts 65 by means, not shown, connected with the main shaft 63.

The arrangement is such that, as can be seen from FIG. 11 while one transfer device is moving a blank into position relative to the die 16 the heater means for the other transfer device is applying heat to the endmost blank in the magazine with which said other tarnsfer device co-operates. As mentioned above, means are operable to effect relative movement between the heater means and the endmost blank in a stack when the setting-up apparatus is rendered inactive, or alternatively transfer devices will be arrested in positions such that the heater elements movable therewith are located in positions remote from the magazines and the die so that the heaters are ineffective to effect heating of blanks in these positions while the apparatus remains inactive.

This embodiment of the invention also incorporates locating elements 66 which co-operate with the die 16 to locate relative thereto blanks delivered by the transfer devices. The locating elements 66 are movable relative to the die in timed relation with the transfer devices by cams 67 rotatable with the shafts 65, the arrangement being such that each locating element acts alternately as a stop for a blank and as a presser which presses a blank against the locating element at the time acting as a stop.

Movement of the movable side 68 of the die is effected by cams 69 also rotatable with the shafts 65.

The extractor device formed by the suckers 60 is operated from the main shaft 63 by a cam 70 and linkage 71, 72, 73, 74 and when a set-up carton is removed by suckers 60 through the bottom of the die it is delivered by the suckers into the path of a pusher piece 75 carried by an endless conveyor 76. The pusher piece 75 removes the carton from the vicinity of the setting-up apparatus.

From the foregoing it will be understood that the apparatus above described and constructed in accordance with the invention provides for the heating of the thermoplastic adhesive composition to be effected primarily before the blank is set-up by movement thereof into the die, the heating being commenced while the blank is in the magazine and continued by the heater devices provided on the transfer device up to the time that the transfer device releases the blank for movement into the die by the forming plunger.

Thus, although the die is also heated by the heater elements 49, 50, described with reference to FIGS. 1 to 8, to ensure the required softened condition of the adhesive composition at the time of the pressing together of the overlying portions, 9, 10, it is not necessary for the blank to remain in the die while the adhesive composition is heated from the cold condition thereof to the plastic condition at which it will satisfactorily share the portion 9 to the portions 10.

I claim:

1. Carton setting-up apparatus comprising a plunger, a die into which a carton blank can be pressed by the plunger to effect the setting-up thereof and the pressing together of overlying blank portions which during setting-up are to be secured one to the other by a thermoplastic adhesive composition pre-applied to the blank, a magazine to contain a stack of said carton blanks, a transfer device to remove an endmost blank from the stack and to release it at a position over the die for movement into the die by the plunger, and heater means movable with the transfer device to effect heating of a blank in the regions thereof to which said adhesive composition is pre-applied, said heater means being operable to apply heat to a blank on engagement thereof by the transfer device and to maintain the application of heat to the blank at least until the blank is released by the transfer device.

2. Apparatus according to claim 1, wherein the transfer device is supported for movement between the blank-receiving and blank-delivery positions thereof by transfer link mechanism operable in timed relation with said plunger.

3. Apparatus according to claim 1, including means operable in response to the rendering inactive of the apparatus to effect relative movement between the endmost blank in the magazine and heater means adapted to effect heating of said regions of the blank thereby to render the heater means ineffective to effect heating of said regions.

4. Apparatus according to claim 1, including auxiliary heater means co-operating with the magazine to effect heating of an endmost blank in regions thereof to which said adhesive composition is pre-applied, said auxiliary heater means being effective on the blank before removal of the blank from the magazine by the transfer device.

5. Apparatus according to claim 4, wherein the auxiliary heater means are supported for movement relative to the magazine to permit movement thereof into and out of proximity with the regions of the blank to be heated thereby, and including actuator means operable in timed relation with the movements of the transfer device to effect movement of the auxiliary heater means away from the blank just prior to engagement of the blank by the transfer device.

6. Apparatus according to claim 5, wherein the auxiliary heater means are supported for rocking movement and the actuator means comprises link mechanism connected with the auxiliary heater means to effect rocking thereof, a rock shaft connected with a driving shaft arranged to effect rocking of the rock shaft, and an actuator cam movable with the rock shaft and co-operating with the link mechanism to effect rocking of the auxiliary heater means.

7. Apparatus according to claim 6, wherein trip means is arranged to co-operate with the auxiliary heater means and to effect movement thereof out of proximity with a blank when the setting-up apparatus is rendered inactive.

8. Apparatus according to claim 7, wherein the trip means includes an electromagnet, levers rockable by the armature of the electromagnet, and connecting links coupling the levers with the link mechanism for effecting movement thereof into and out of proximity with a blank, said electromagnet being operated by start/stop means for the apparatus to effect movement of the auxiliary heater means out of proximity with a blank when the apparatus is rendered inactive and to restore it to the blank heating position thereof when the apparatus is rendered active.

9. Apparatus according to claim 8, wherein the heating means and auxiliary heater means each comprise radiant electrical heating devices.

10. Apparatus according to claim 1, including heater means co-operating with the die to retain the heated condition of said blank regions during setting-up of the blank and the securing of said overlying blank portions.

11. Apparatus according to claim 1, wherein the heating means comprise radiant electrical heating devices.

12. Apparatus according to claim 1, including an extractor device operable in timed relation with the transfer device to remove a set-up carton through the bottom of the die.

13. Apparatus according to claim 12, including a conveyor device operable to receive a set-up carton from the extractor device and to remove it from the vicinity of the setting up apparatus.

14. Carton setting-up apparatus comprising a plunger, a die into which a carton blank can be pressed by the plunger to effect the setting-up thereof and the pressing together of overlying blank portions which during setting-up are to be secured one to the other by a thermoplastic adhesive composition pre-applied to the blank, a pair of magazines disposed respectively on opposite sides of the path of the plunger and each arranged to contain a stack of said carton blanks, a pair of transfer devices, one for each said magazine, operable alternately to remove an endmost blank from the magazine appropriate thereto and to release it at a position over the die for movement by the plunger into the die, and heater means movable with each said transfer device to effect heating of a blank in the regions thereof to which said adhesive composition is pre-applied, said heater means being operable to apply heat to a blank on engagement thereof by the transfer device appropriate thereto and to maintain the application of heat to the blank at least until the blank is released by the transfer device.

15. Apparatus according to claim 14, including locating elements co-operating with the die to locate relative thereto blanks delivered by the transfer devices, said locating elements being movable relative to the die in timed relation with the transfer devices alternately to act as a stop for a blank and to act as a presser to press a blank against the locating elements at the time acting as a stop.

16. Apparatus according to claim 14, wherein the transfer devices are supported for movement between the blank receiving and blank-delivering positions thereof by transfer link mechanism operable in timed relation with said plunger.

17. Apparatus according to claim 14, including heater means co-operating with the die to retain the heated condition of said blank regions during setting-up of the blank and the securing of said overlying blank portions.

18. Apparatus according to claim 14, wherein the heating means comprise radiant electrical heating devices.

19. Apparatus according to claim 14, including an extractor device operable in timed relation with the transfer device to remove a set-up carton through the bottom of the die.

20. Apparatus according to claim 19, including a conveyor device operable to receive a set-up carton from the extractor device and to remove it from the vicinity of the setting up apparatus.

References Cited in the file of this patent
UNITED STATES PATENTS
2,874,619    Phin  ---------------- Feb. 24, 1959